Patented Nov. 24, 1931

1,833,245

UNITED STATES PATENT OFFICE

FRIEDRICH FELIX, OF BASEL, SWITZERLAND, ASSIGNOR TO THE FIRM OF SOCIETY OF CHEMICAL INDUSTRY IN BASLE, OF BASEL, SWITZERLAND

CONDENSATION PRODUCT AND PROCESS OF MAKING SAME

No Drawing. Application filed September 12, 1929, Serial No. 392,249, and in Switzerland September 18, 1928.

This invention relates to the manufacture of new condensation products which are useful as auxiliary agents in industry. It comprises the process of making these products as well as the products themselves.

In French specification No. 658,364 it has been shown that benzoin can be condensed with various aromatic sulfonic or carboxylic acids to form condensation products which are useful, among other purposes, as auxiliary agents in industry.

According to the nature of the sulfonic or carboxylic acid used there may be produced condensation products containing up to two molecules of benzoin.

By the present invention valuable condensation products are obtained by causing benzoin and an alcohol, which may be aliphatic, cyclic or aromatic-aliphatic, to act simultaneously or in any desired order of succession on a sulfonic or carboxylic acid of an aromatic compound, such as a benzene sulfonic acid, a naphthalene sulfonic acid, a benzene carboxylic acid, an oxynaphthalene carboxylic acid or the like which products may be represented by the general formula aryl-$x$ ($x=SO_3H$ or $COOH$), in presence of an agent having a condensing action, such as sulfuric acid, sulfuric acid monohydrate, oleum, chloro-sulfonic acid or the like.

Like compounds may also be made by treating a mixture of the benzoin, an alcohol and an aromatic compound with an agent which has simultaneously a condensing and a sulfonating action.

As alcohols which come particularly into question for the purpose of the invention there may be mentioned ethyl alcohol, propyl alcohols, butyl alcohols, heptyl alcohols, cyclohexanol, benzyl alcohol and the like. They may be used singly or in admixture.

The condensation products obtainable in accordance with the invention, constituting in a dry state uncolored to feebly colored powders, may have not only an advantageous dispersing action, but they may also have a surprisingly good capacity for promoting wetting, and form dilute solutions which may have a very small surface tension. They are therefore valuable auxiliary agents in the textile industry, and may be used with good results as additions to baths for washing or dyeing various textile materials, for carbonizing wool, for finishing or the like. The products are not, however, restricted in their application to the textile industry; they may also find a useful application inter alia in the leather industry or the like for the production of dyeings or dyestuff preparations, or also as precipitant for the production of colored varnishes.

The constitution of the new products is not known.

The following examples illustrate the invention, the parts being by weight, the last five examples exhibiting the valuable properties of the new products.

*Example 1*

64 parts of naphthalene are sulfonated at 160° C. by means of 111 parts of concentrated sulfuric acid. The solution so obtained is cooled to 80° C. and there are added first 100 parts of sulfuric acid, and then within a few minutes 53 parts of powdered benzoin. As soon as a sample dissolves in water to a clear solution the reaction mixture is heated to 100–105° C. and there are introduced drop by drop whilst stirring 45 parts of isopropyl alcohol. The whole is then stirred for a further 1½–2 hours and is then cooled. A resinous product is obtained which is freed as far as possible from sulfuric acid and dissolved by adding 1200–1500 parts of water and sufficient caustic soda solution or sodium carbonate to produce a neutral solution; the product is precipitated from the solution at boiling temperature by the addition of 150–200 parts of common salt. After allowing the mixture to cool the product is separated by filtration and dried. It is a greyish-white powder which is easily soluble in hot water, in dilute acids and in dilute alkalies. An aqueous solution containing per litre 1 gram of the product produces a foam which is very stable and resembles in its behaviour that of a solution of soap. The capacity of solutions of the product for promoting wetting is appreciably superior to that of a product which can be made from isopropyl alcohol and naphthalene-sulfonic acid alone, and to that of a product obtainable by mixing separately prepared condensation products of naphthalene sulfonic acid with benzoin and with isopropyl alcohol respectively.

The condensation may also be effected with a more dilute sulfuric acid. By replacing the 100 parts of sulfuric acid with which the sulfonation mass has been diluted before the condensation by a mixture of 100 parts of sulfuric acid and 50 parts of water, there is for example obtained a product having excellent properties.

Example 2

64 parts of naphthalene are sulfonated at 160° C. by means of 111 parts of sulfuric acid. The sulfonation mixture is cooled to 80° C., diluted by the addition of 150 parts of sulfuric acid, and there are added in portions 106 parts of benzoin. The condensation is completed as soon as a sample dissolves in water to a clear solution, whereupon the reaction mixture is heated to 100–105° C., 30 parts of isopropyl alcohol are introduced drop by drop whilst well stirring, and the whole is stirred for about 2 hours at the aforesaid temperature. The product is isolated in a manner similar to that described in Example 1; it is similar in its properties to the product described in that example.

An analogous product can be obtained by substituting diphenyl for the naphthalene.

Example 3

64 parts of naphthalene are sulfonated in the manner prescribed in Example 1 and diluted at 100° C. by the addition of 100 parts of sulfuric acid. There are then added first 26 parts of benzoin and then 53 parts of isopropyl alcohol, and the whole is stirred for 2 hours at the aforesaid temperature. The mass is then dissolved in 2000 parts of hot water, the solution is neutralized by the addition of milk of lime, the precipitated calcium sulfate is removed by filtration, and the calcium salt of the new product contained in the filtrate is converted into the sodium salt by the addition of sodium carbonate. After separation of the precipitated calcium carbonate by filtration the solution of the sodium salt of the new product may be evaporated to dryness, or the sodium salt may be precipitated by the addition of common salt.

Example 4

64 parts of naphthalene are sulfonated in the manner prescribed in Example 1, the sulfonation mixture is diluted by the addition of 50 parts of sulfuric acid and condensed first with 26 parts of benzoin at 80° C. and thereafter with 28 parts of butyl alcohol at 105° C. The product may be isolated by working up the reaction mixture in the manner described in Example 1.

Example 5

64 parts of naphthalene are sulfonated in the manner prescribed in Example 1 and the sulfonation mixture is diluted by the addition of 100 parts of sulfuric acid. There are then introduced drop by drop whilst stirring 53 parts of isopropyl alcohol, the temperature being 100–105° C. After stirring has been continued for 2 hours the mixture is brought to a temperature of 80° C. and 26 parts of benzoin are added. The product is isolated according to one of the usual methods; it resembles the product of Example 3.

Example 6

64 parts of napthalene, 53 parts of benzoin and 37 parts of butyl alcohol are melted together and the melt is treated with 100 parts of chloro-sulfonic acid at 60–70° C. whilst stirring. When elimination of hydrogen chloride has substantially ceased and a sample of the reaction mass dissolves in water to a clear solution, the reaction mixture is worked up in the manner described in Example 1 in order to isolate the product.

Example 7

53 parts of benzoin are introduced into a sulfonation mixture which has been diluted by the addition of 100 parts of sulfuric acid and contains 104 parts of naphthalene-2-sulfonic acid, the temperature being 80° C. When the reaction is finished the mass is heated to 110° C. and 48 parts of ethyl alcohol are added whilst stirring. The mixture is stirred for a further 2 hours at this temperature, and is then worked up according to one of the methods described in the foregoing examples.

The procedure is similar if there is used instead of benzoin a homologue or substitution product thereof, or if there is used an alcohol other than those named in the examples. Products may also be made which contain 1 molecular proportion of the benzoin alcohol mixture for each molecular proportion of the aromatic sulfonic acid or carboxylic acid. The proportions indicated in the examples may be varied within wide limits.

Example 8

20 parts of aluminium sulfate are dissolved in 800 parts of water and there is added to the solution a solution of 10 parts of calcined sodium carbonate in 100 parts of water whereby there is obtained a suspension of aluminium hydroxide in a solution of sodium sulfate. To this suspension are added whilst stirring 10 parts of a solution of Rhodamine B (1:50) and an equeous solution of 1 part of the condensation product obtained as described in Example 1. The dyestuff and barium sulfate are then simultaneously precipitated by the addition of 40 parts of a solution of barium chloride (1:10). There is thus produced a completely clear solution and a Rhodamine lake which settles quickly and completely and is easily filtered; its colour is appreciably brighter and richer than that of a lake prepared in like manner without the addition of the condensation product. From Methylene Blue D there may be obtained in a similar manner a pure blue lake. The products obtainable by sulfonating the residues of the distillation of benzaldehyde and turpentine oil behave in a similar manner.

*Example 9*

15 parts of the dyestuff from diazotized metanitraniline and cresidine, in the form of a press cake of 30 per cent. strength, are agitated in a suitable mill with 2,5 parts of a solution of 50 per cent. strength of the product obtained as described in Example 2 until a sample yields a homogeneous emulsion when diluted with water. There is thus obtained a liquid paste which is excellently suited, for example, for the production of a dyebath for cellulose acetate silk. Similar pastes are obtained if there is used instead of an azo-dyestuff an anthraquinone derivative or an indophenol.

The pastes obtainable in the manner above described may be converted by evaporation into dry preparations, if required, after the addition of a further quantity of the new condensation product of sulfite cellulose waste liquor.

The preparations so obtained are useful for dyeing cellulose acetate such as acetate silk.

The procedure in the case of vat-dyestuffs is similar to that above described.

*Example 10*

The material is dyed in the usual manner with Cibanone Yellow 3G (c. f. Colour Index, page 347) with the addition, per liter of dye liquor, of 0,75 gram of the product obtained as described in Example 1. The vat is clearer and the dyeing produced is appreciably fuller than when the dyeing is conducted without the aforesaid addition. A similar improvement is also obtained by the use of the new condensation products as assistants in printing on cotton.

*Example 11*

Crude cotton yarn is handled for 30 minutes in an alkaline solution containing per litre 2 grams of the β-naphthyl-amide of 2:3-oxynaphthoic acid and 5 cc. of a solution of 50 per cent. strength of the product obtained as described in Example 1 or Example 2; the dyeing is then developed in the usual manner by means of diazotized chloraminodiphenyl ether. There is produced a scarlet-red dyeing which is distinguished by its fulness, evenness and good fastness to rubbing.

*Example 12*

1 gram of the product obtained as described in Example 1 is dissolved in 500 cc. of water, and 5 grams of wool yarn are placed on the surface of the liquid. After 7 minutes the yarn has become completely wetted and has sunk to the bottom of the vessel; in order to attain the same wetting with ordinary water a period of several hours is required.

What I claim is:—

1. The manufacture of new condensation products, by causing benzoin and alcohols to react with a naphthalene sulfonic acid in the presence of sulfuric acid.

2. The manufacture of new condensing products, by causing benzoin and an alcohol to react with β-naphthalene sulfonic acid in the presence of sulfuric acid.

3. The manufacture of new condensation products, by causing benzoin and an aliphatic alcohol having 3 to 4 carbon atoms to react with β-naphthalene sulfonic acid in the presence of sulfuric acid.

4. The manufacture of new condensation products, by causing benzoin and isopropyl alcohol to react with β-naphthalene sulfonic acid in the presence of sulfuric acid.

5. The manufacture of a new condensation product, by causing half a molecular proportion of benzoin and then one and a half molecular proportions of isobutyl alcohol to react with one molecular proportion of β-naphthalene sulfonic acid in the presence of sulfuric acid.

6. As new products of manufacture, the condensation products which are obtained by causing benzoin and alcohols to react with a naphthalene sulfonic acid in the presence of sulfuric acid, which products, in the form of their alkali metal salts, form uncolored to feebly colored powders which are easily soluble in water, the solutions thus obtained having a very small surface tension and a great dispersing action.

7. As new products of manufacture, the condensation products which are obtained by causing benzoin and an alcohol to react with β-naphthalene sulfonic acid in the presence of sulfuric acid, which products, in the form of their alkali metal salts, form uncolored to feebly colored powders which are easily soluble in water, the solution thus obtained having a very small surface tension and a great dispersing action.

8. As new products of manufacture, the condensation products which are obtained by causing benzoin and an aliphatic alcohol having 3 and 4 carbon atoms to react with β-naphthalene sulfonic acid in the presence of sulfuric acid, with products, in the form of their alkali metal salts, form uncolored to feebly colored powders which are easily soluble in water, the solutions thus obtained having a very small surface tension and a great dispersing action.

9. As new products of manufacture, the condensation products which are obtained by causing benzoin and isopropyl alcohol to react with β-naphthalene sulfonic acid in the presence of sulfuric acid, which products, in the form of their alkali metal salts, form uncolored to feebly colored powders which are easily soluble in water, the solutions thus obtained having a very small surface tension and a great dispersing action.

10. As a new product of manufacture, the condensation product which is obtained by causing half a molecular proportion of benzoin and then one and a half molecular proportions of isobutyl alcohol to react with one molecular proportion of β-naphthalene sulfonic acid in the presence of sulfuric acid, which product, in the form of its alkali metal salt, form an uncolored to feebly colored powder which is easily soluble in water, the solution thus obtained having a very small surface tension and a great dispersing action.

In witness whereof I have hereunto signed my name this 3rd day of September, 1929.

FRIEDRICH FELIX.